US006100906A

United States Patent [19]
Asaro et al.

[11] Patent Number: 6,100,906

[45] Date of Patent: Aug. 8, 2000

[54] METHOD AND APPARATUS FOR IMPROVED DOUBLE BUFFERING

[75] Inventors: Antonio Asaro, Scarboro; Indra Laksono, Richmond Hill; James Doyle, Thornhill; Gordon F. Grigor, Toronto, all of Canada

[73] Assignee: ATI Technologies, Inc., Thornhill, Canada

[21] Appl. No.: 09/064,569

[22] Filed: Apr. 22, 1998

[51] Int. Cl.[7] .................................................... G06F 13/00

[52] U.S. Cl. ........................... 345/508; 345/522; 345/213

[58] Field of Search .................................... 345/501, 502, 345/507, 508, 509, 522, 213

[56] References Cited

U.S. PATENT DOCUMENTS 5,657,478 8/1997 Recker et al. .......................... 395/503

*Primary Examiner*—Kee M. Tung
*Attorney, Agent, or Firm*—Markison & Reckamp, P.C.

[57] ABSTRACT

A method and apparatus for improved double buffering within a computing system begins when a series of data blocks are received from a central processing unit at a rate independent of a processing rate of a recipient engine. For example, a video graphics circuit receives a series of data blocks representing video frames from the central processing unit at a rate independent of the refresh rate of the display. As the data blocks are received, the video graphics circuit queues commands of the data blocks. Typically, the commands include processing commands and a processing rate synchronize command. To process the data blocks, the co-processor pulls commands from the queued list and processes them to produce recipient data. As the co-processor is producing the recipient data, it is utilizing a first buffer. The co-processor continues to process the commands and storing the results into the first buffer until the processing rate synchronize command is detected. At this point, the co-processor pauses processing of the commands. At the beginning of the next cycle of the processing rate, the recipient data is provided from the first buffer to the recipient engine and the co-processor resumes processing of commands, which relate to another data block. As the co-processor is processing the commands of the second data block, it is utilizing a second buffer to store the processed data, i.e., the second recipient data.

23 Claims, 6 Drawing Sheets comparison of processing co-processing circuit 90 video graphics circuit 70

METHOD AND APPARATUS FOR IMPROVED DOUBLE BUFFERING

TECHNICAL FIELD OF THE INVENTION

The present invention relates generally to computer systems and more particularly to double buffering within such systems.

BACKGROUND OF THE INVENTION

A computer is known to include a central processing unit, system memory, video graphic circuitry, audio processing circuitry, and peripheral ports. The peripheral ports allow the computer to interface with peripheral devices such as printers, monitors, external tape drives, the Internet, etc. In such a computer, the central processing unit functions as a host processor while the video graphics circuit functions as a loosely coupled co-processor. In general, the host processor executes applications and, during execution, calls upon the co-processor to execute its particular function. For example, if the central processing unit requires a drawing operation to be done, it requests the video graphics co-processor to perform the drawing function. The request may be a command provided to the video graphics co-processor through a command delivery system.

In many computer systems that include advance video graphics circuitry, the video graphics circuitry includes a double buffering system. The double buffering system includes memory that is divided into two sections (i.e., a front buffer and a back buffer) and interfacing circuitry such that the appropriate buffer is read from and/or written to. In practice, the front buffer stores fully rendered images and is operably coupled to a display driver. The display driver, which drives a display, such as a CRT monitor, television, LCD panel, etc., retrieves the fully rendered images from the front buffer and provides them to the display. While the front buffer is supplying rendered images to the display, the back buffer is used to store images that are in the process of being rendered by the video graphics circuitry. Once the video graphics circuitry has completed the rendered of the current images and the fully rendered images in the front buffer have been provided to the display, the front and back buffers are flipped. As such, the previous front buffer now becomes the back buffer and is used to store new images as they are rendered, while the back buffer is provided the rendered images it stores to the display driver. The front and back buffers continually flip in this manner, which occurs during the blanking interval of the video data such that tearing (i.e., a visible separation of images) does not occur. Typically, the buffers flip at the refresh rate of the display (e.g., 50 Hz, 60 Hz, 75 Hz, and 90 Hz), which is in synchronization with the video graphics circuitry rendering a new frame of data (i.e., images).

As is generally known, the rendering process includes a software portion, which is performed by the host processor, and a hardware portion, which is performed by the video graphics circuit. In general, the software portion generates graphics data (e.g., physical coordinates, texture coordinates, alpha-blending parameters, etc. of images to be rendered) and provides the graphics data to the video graphics circuitry. This software processing is often referred to as video graphics software overhead. As the video graphics circuitry receives the graphics data, it processes the data to render the images. During the graphics data generation process and the rendering process, the software and hardware inter-react to determine when the back and front buffers should be flipped. The software handles a majority of the determination process by polling the video graphics circuit to determine when it has completed its current rendering operation. When the video graphics circuit has completed its current rendering operation and the video data is in the vertical blanking section, the page flip occurs.

As the complexity and intricacy of images being displayed increase, the video graphics circuitry may not be able to completely render a new frame of data (e.g., images) during a refresh cycle (i.e., the inverse of the refresh rate of the display). As such, the video graphics circuitry requires two or more refresh cycles to render the current frame of data. When this occurs, the software portion is stalled in a polling operation, waiting for the video graphic circuitry to complete it current operation. As such, flipping of the buffers (often referred to as page flipping) does not occur such that the providing of new images to the display is occurring at a fraction of the refresh rate, which may cause adverse visual effects. In this situation, up to twenty-five percent (25%) of the CPU's processing time may be consumed by polling the video graphic circuit. As such, the central processing unit is consuming valuable processing resources to poll the video graphics circuitry and the resulting video quality may be less than desirable.

Therefore, a need exists for a method and apparatus that improves page flipping for double buffered systems that substantially reduces the need for polling by the central processing unit and substantially reduces the potential for reduced video quality.

DETAILED DESCRIPTION OF A PREFERRED EMBODIMENT

Generally, the present invention provides a method and apparatus for improved double buffering within a computing system. The double buffering process begins when a series of data blocks are received from a central processing unit at a rate independent of a processing rate of a recipient engine. For example, a video graphics circuit receives a series of data blocks representing video frames from the central processing unit at a rate independent of the refresh rate of the display. As the data blocks are received, the video graphics circuit queues commands of the data blocks. Typically, the commands include processing commands and a processing rate synchronize command. To process the data blocks, the co-processor pulls commands from the queued list and processes them to produce recipient data (e.g., rendered images). As the co-processor is producing the recipient data, it is utilizing a first buffer (e.g., a back buffer). The co-processor continues to process the commands and storing the results into the first buffer until the processing rate synchronize command is detected. At this point, the co-processor pauses processing of the commands. At the beginning of the next cycle of the processing rate, the recipient data is provided from the first buffer to the recipient engine and the co-processor resumes processing of commands, which related to another data block. As the co-processor is processing the commands of the second data block, it is utilizing a second buffer to store the processed data, i.e., the second recipient data. With such a method and apparatus, the central processing unit no longer needs to poll the co-processor to determine its status. As such, the dependency between the software and hardware of many co-processing applications, including video graphics applications, has been removed, thereby enabling the central processing unit to provide the data blocks at a rate which is independent of the processing rate of the co-processor and/or the recipient processor.

Figure 1:
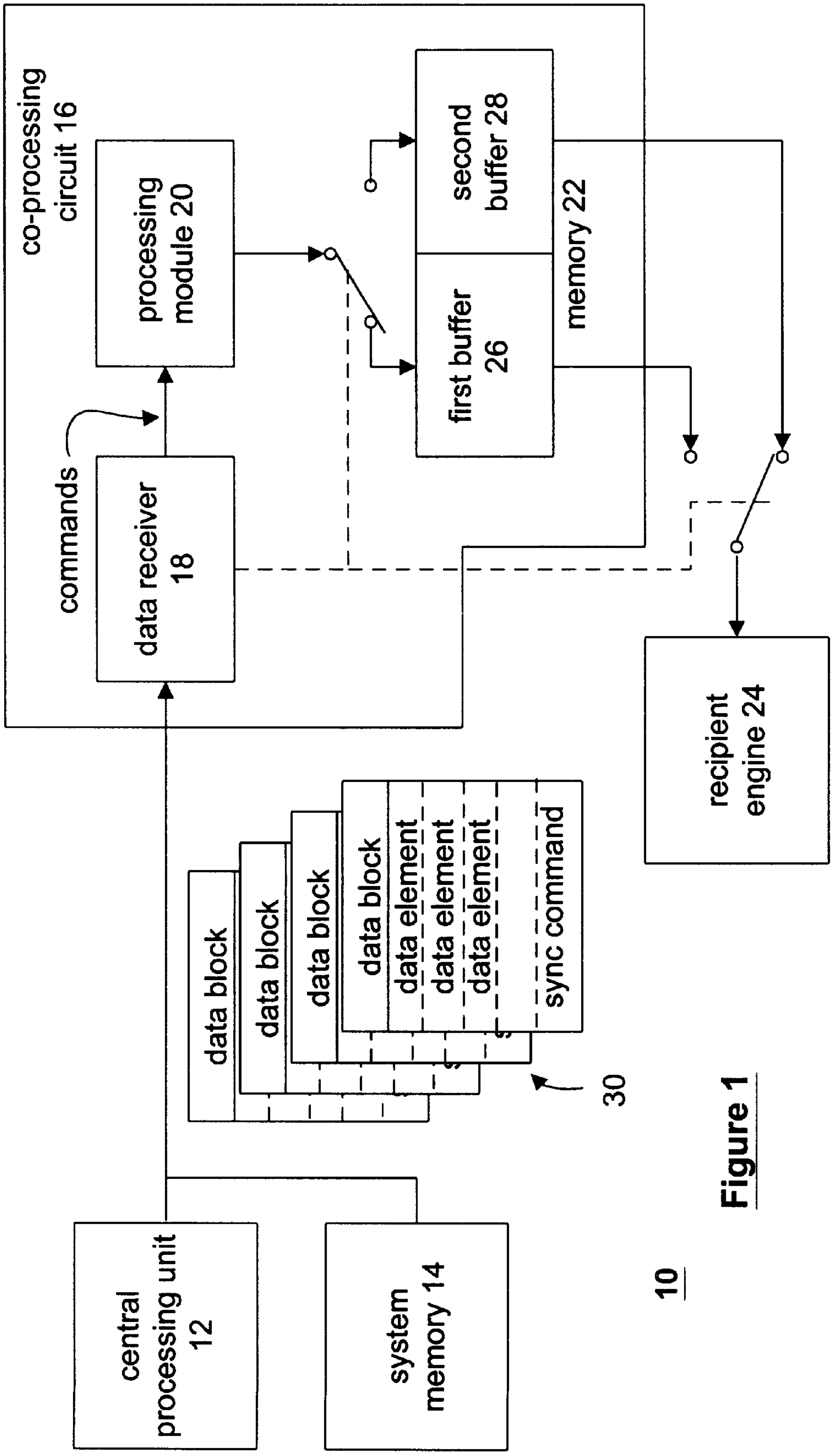
FIG. 1 illustrates a schematic block diagram of a computer system in accordance with the present invention.

The present can be more fully described with reference to FIGS. 1 through 7. While FIGS. 1 through 7 illustrate an embodiment and/or several embodiments of the present invention, one of average skill in the art would readily appreciate that the other embodiments may be derived from the teachings of the present invention without deviating from the scope of the present invention. FIG. 1 illustrates a schematic block diagram of a computing system 10 that includes a central processing unit 12, system memory 14, a co-processing circuit 16, and a recipient engine 24. The central processing unit 12 may be a central processing unit of a personal computer, laptop computer, work station, hand held computer, personal digital assistant (PDA), or it may be an integrated circuit, or plurality of integrated circuits, such as a microprocessor, microcontroller, microcomputer, digital signal processor, and/or any device that manipulates digital information based on programming instructions. The system memory 14 may be hard drive memory, read-only memory, random access memory, DVD memory, floppy disk memory, CD memory, external magnetic tape memory, and/or any device that stores digital information.

The co-processing circuit 16 includes a data receiver 16, a processing module 20, and memory 22. The memory 22 includes a first buffer section 26 and a second buffer section 28. The memory 22 may any storage device that stores digital information, such as random access memory, dynamic random access memory, static random access memory, cache memory, etc. The processing module 20 may be a microprocessor, microcontroller, digital signal processor and/or any device that manipulates digital information based on programming instructions. The data receiver 18 includes a memory section that has at least a portion of it arranged as a first in first out (FIFO) buffer and a command engine (both of which will be discussed in greater detail with reference to FIG. 2).

In operation, the data receiver 18 receives data elements of a given data block 30 from the central processing unit 12 and stores them in memory. The data elements include commands and/or data that is to be processed in accordance with the commands, where the commands further include data processing commands and a synchronize command. The central processing unit 12 provides the data blocks 30 at a rate that is convenient for the central processing unit 12 and can be done at a rate that is independent of the processing rate of the co-processor 16 and/or the recipient engine 24. As such, the central processing unit 12 may provide a continuous stream of data blocks 30 to the co-processor 16, it may provide a group of data blocks in a continuous fashion-pause-then provide another group of data blocks in a continuous fashion, etc. As one of average skill in the art will appreciate, by including a synchronize command in each data block, which typically indicates the end of a data block, the dependency between the central processing unit and the co-processor 16 is substantially eliminated, i.e., the dependency between the software and hardware is substantially eliminated. As such, the central processing unit 12 is free to provide the data blocks at any rate and in almost any pattern (e.g., groups of data blocks, a continuous stream, etc.). As one of average skill in the art will appreciate that there still exists a minimal amount of dependency between the central processing unit and the co-processor, since the central processing unit cannot supply more data blocks than can be stored by the co-processor.

As the data receiver 18 receives the data elements, the commands are stored in the FIFO, which are subsequently pulled therefrom by the processing module 20. As the processing module 20 pulls the commands from the FIFO, the data receiver 18 monitors the type of commands. The data receiver 18 allows the data processing commands to pass to the processing module 20 such that the data processing module 20 may process the data in accordance with the retrieved data processing command. When the next command in the FIFO is the synchronize command, the data receiver 18 prevents the processing module 20 from pulling any further commands from the FIFO until the next processing cycle (e.g., until the next frame of video data is to be rendered). In addition, the data receiver 18 flips the connections between the memory 22, the processing module 20, and the recipient engine 24 at the beginning of the next processing cycle.

Prior to the detection of the synchronize command, the processing module 20 processes the retrieved data in accordance with the retrieved data processing commands and stores the processed data in the first buffer 26. This, of course, assumes the coupling between the processing module 20 and the memory 22 is as shown in FIG. 1. In this configuration, the first buffer 26 acts as a work pad for the processing module 20. While the processing module 20 is writing processed data to the first buffer 26, the recipient engine 24 is reading previously processed data from the second buffer 28. Note that the recipient engine 24 may be another co-processor that is dependent upon the data produced by co-processing circuit 16. For example, if the co-processor 16 is a video graphics co-processor, the recipient engine 24 may be a display driver that drives a computer display and/or television. As further examples, the recipient engine 24 may be a television encoder, a print driver, an audio driver, etc.

When the synchronize command is detected and the next processing cycle begins (e.g., the next frame of video data is ready to be displayed), the data receiver 18 changes the coupling between the processing module 20 and the memory 22 and the coupling between the memory 22 and the recipient engine 24. The new coupling has the processing module writing processed data of the next data block into the second buffer 28, while the recipient engine 24 reads the previously processed data from the first buffer 26. Note that, while the switching between the first and second buffers 26 and 28 is illustrated as physical switches, the switching may be done in software by changing values stored in offset registers used by the processing module 20 and the recipient engine 24 to address the memory 22.

Figure 2:
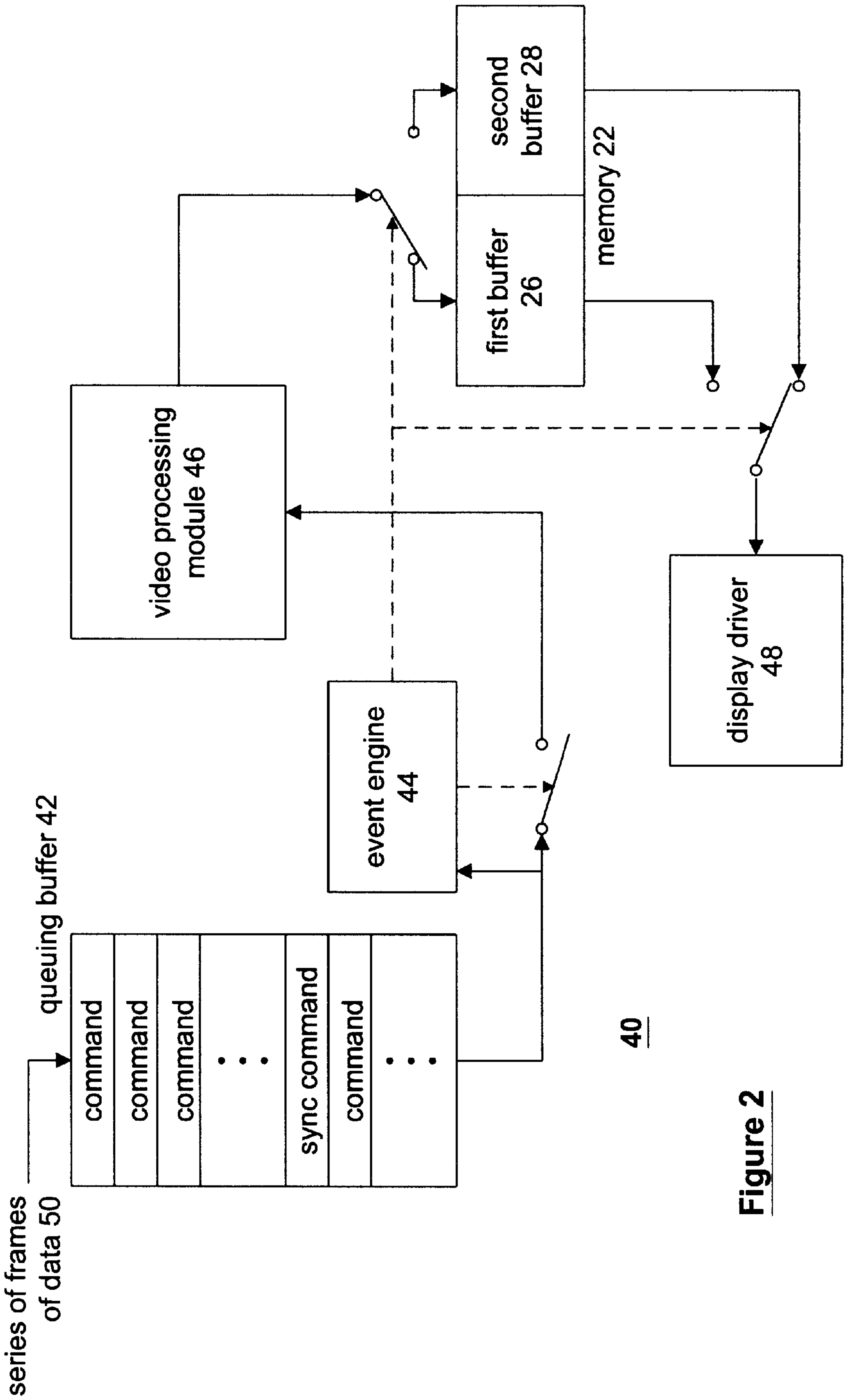
FIG. 2 illustrates a schematic block diagram of a video graphics circuit in accordance with the present invention.

FIG. 2 illustrates a schematic block diagram of a video graphics circuit 40 that includes a queuing buffer 42, an event engine 44, a video processing module 46, and the memory 22. The video graphics processing module 44 is operably coupled to a display driver 48, which may be a software module that drives a display of a computer (laptop, PC, hand-held, workstation, etc.), a television, a personal digital assistant, and/or video game. The video graphics processing module 44 may include a set-up engine, an edgewalking circuit, and a pixel processor. The video graphics circuit 40 may further include additional memory operably coupled to receive and store data blocks, or portions thereof, of video data and to provide data elements to the queuing buffer 42. As such, the additional memory receives a series of frames of video data (or a series of fields of video data) 50 from the central processing unit 12. As with the embodiment of FIG. 1, the central processing unit 12 may provide a continuous stream of data blocks 50, it may provide a group of data blocks in a continuous fashion-pause-then provide another group of data blocks in a continuous fashion, etc., wherein each data block includes a synchronize command.

Data elements are then transferred from the additional memory to the queuing buffer 42, which is arranged as a FIFO. The video processing module 46 pulls data elements from the queuing buffer 42, where the data elements of a data block include graphics data, data processing commands, and a synchronize command. The graphics data may be vertex information for each triangle of images to be rendered, where the vertex information includes physical coordinates, texture coordinates, color information, alpha blending parameters, and/or a second set of texture coordinates for each vertex of a triangle. The video processing module 46 processes the vertex information, based on the commands, to render a frame of data, which is stored in the first buffer 26 as it is being processed. As the current frame of video data is being written into the first buffer, the display driver 46 is reading video data of a previously processed frame of video data from the second buffer 28. In this configuration, the first buffer 26 is acting as the back buffer, while the second buffer 28 is acting as the front buffer.

The event engine 44 is operably coupled to monitor the commands pulled from the queuing buffer 42. The event engine 44 allows commands to pass to the video processing module 46 until it detects the synchronize command. At this point, the event engine 46 prevents further commands to be pulled from the queuing buffer by the video processing module 46. This may be done by physically opening a switch or by software programming that prevents commands to be pulled until the next processing cycle, i.e., the next refresh cycle. When the event engine 44 detects the next processing cycle, it allows the video processing module 46 to pull the commands for the next video data block.

Figure 3:
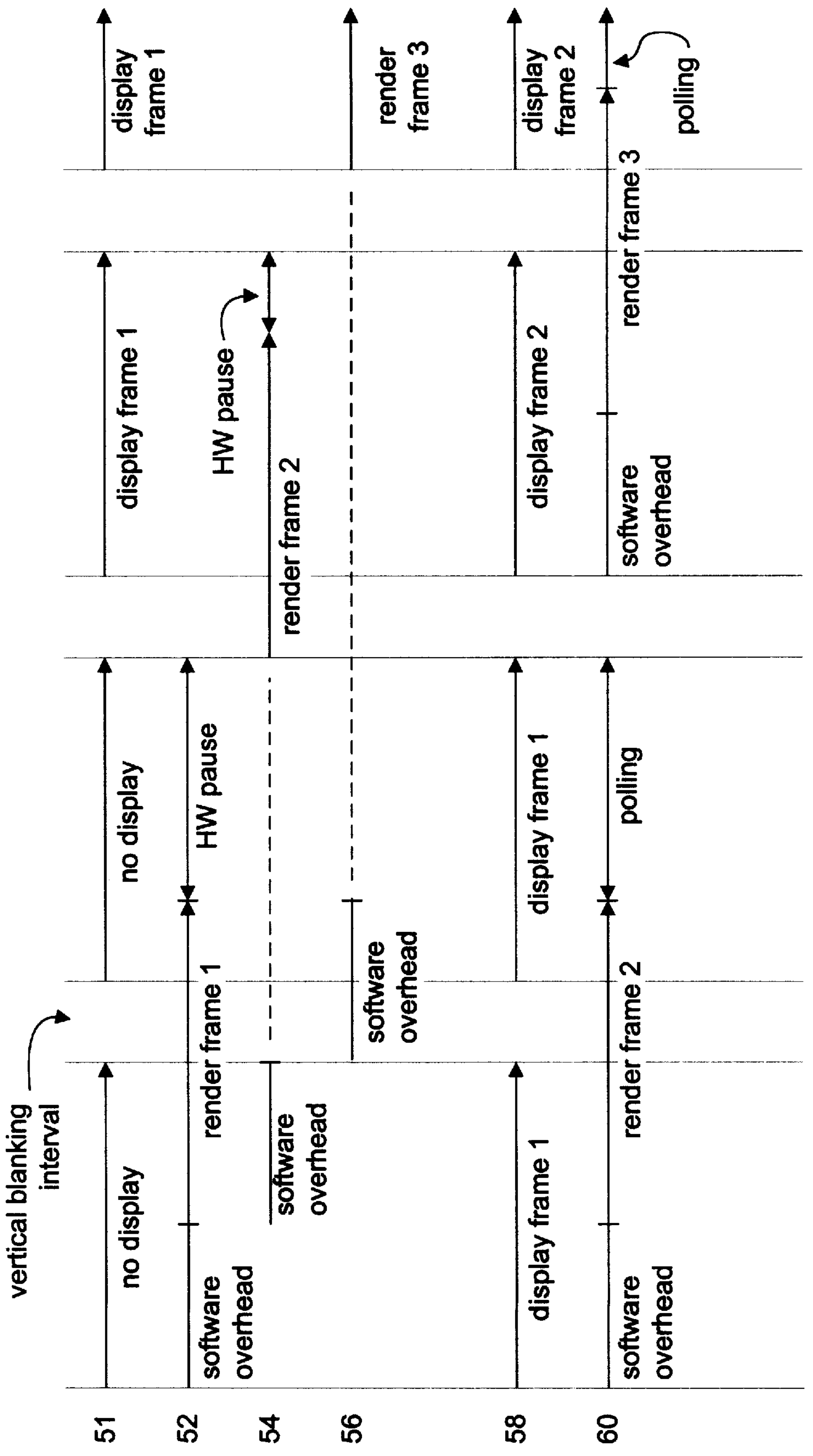
FIG. 3 illustrates a graphical representation of a double buffering process in accordance with the present invention.

FIG. 3 illustrates a graphical representation of the processing of the video graphics circuit 40 in comparison with a prior art video graphics circuit. The vertical lines correspond to the processing cycles, which for a video graphics circuit, relates to the refresh rate of a display. In particular, the first vertical line corresponds to the beginning of a refresh cycle. The second vertical line corresponds to the end of the video data portion of the refresh cycle and the beginning of the vertical blanking interval. The third vertical line corresponds to the end of the vertical blanking interval and the beginning of the next refresh cycle. For example, the refresh cycle is the inverse of the refresh rate, which may be 60 hertz, 75 hertz, 90 hertz, or 120 hertz. As is known, the vertical blanking interval is the time in which the raster of the display is repositioning to the first pixel location of the display. It is also known that this is the time when page flipping occurs, if it is to occur.

The first horizontal line 51 corresponds to video data that is read from the front buffer and provided to the display driver in accordance with the present invention. The second horizontal line 52 corresponds to the rendering process of the first frame of video data. The third horizontal line 54 corresponds to the rendering process of the second frame of video data and the fourth horizontal line 56 corresponds to the rendering process of the third frame of video data. The fifth and sixth horizontal lines 58 and 60 illustrate the rendering process of a prior art video graphics circuit.

As shown, the rendering process includes a software overhead portion, a hardware rendering portion, and a hardware pause portion. For the first frame of video data (line 52), the software overhead (i.e., the data blocks provided by the central processing unit) is directly followed by the hardware rendering of the first frame, which, in turn, is directly followed by the hardware pause. Due the length of the rendering portion, the rendering process of the first frame is not complete prior to the start of the next refresh cycle. Thus, for the first two refresh cycles, nothing is displayed, i.e., the nothing is read from the front buffer (refer to line 51). At the beginning of the blanking interval (vertical, horizontal or other) of the second refresh cycle, the rendering of the first frame is complete, thus a page flip occurs, such that, during the third refresh cycle, the first frame of video data is read from the front buffer. Note that the software overhead for the second and third video frames have been provided in a continuous manner following the software portion of the first video frame (refer to lines 52, 54, and 56). As such, the hardware portion of the rendering of the second frame of video data may begin as soon as the page flip is complete. Thus, the hardware rendering portion of the second frame of video data is complete prior to the beginning of the vertical blanking interval of the third refresh cycle. Thus, during the vertical blanking interval of the third refresh cycle, a page flip can occur such that the second frame of video data is displayed during the fourth refresh cycle, while the third frame of video data is completely rendered. By allowing the software portion to be provided independently of the hardware portion, the frames of video data can be rendered within one refresh cycle.

In contrast, the prior art process does not remove the dependency between the software and the hardware. As such, a page flip occurs every other refresh cycle and a substantial amount of polling is required. As shown at lines 58 and 60, the software overhead is dependent upon the hardware rendering of frames. As such, the software overhead for a next frame of video data is not processed until the hardware rendering of the current frame video data is complete.

Figure 4:
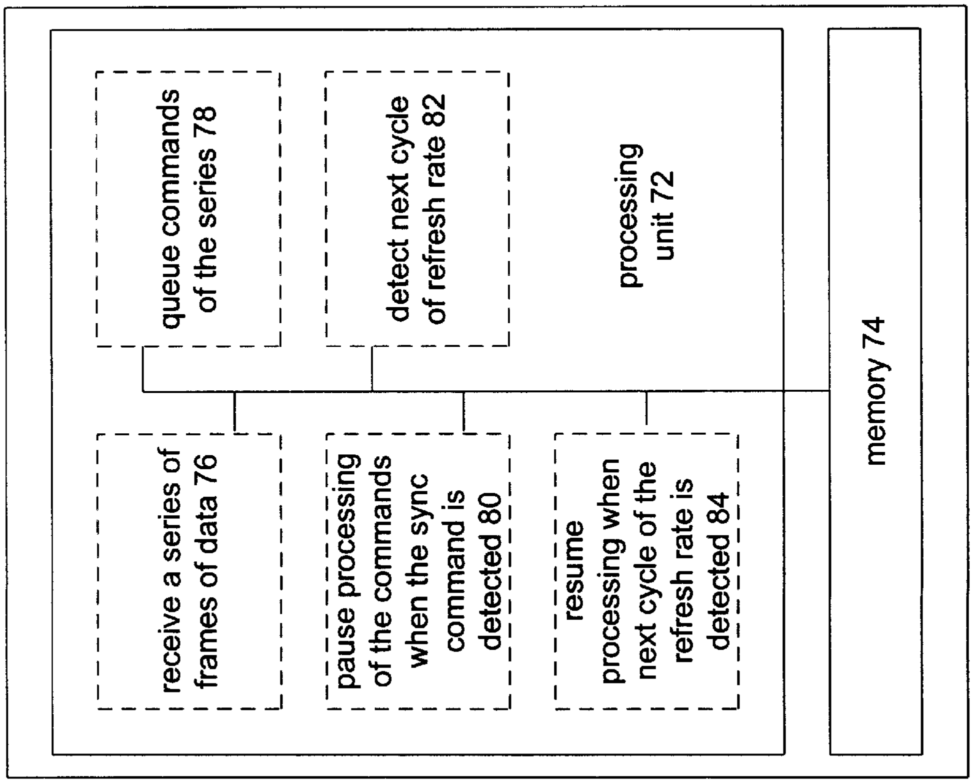
FIG. 4 illustrates a schematic block diagram of another video graphics circuit in accordance with the present invention.

FIG. 4 illustrates a schematic block diagram of a video graphics circuit 70. The video graphics circuit 70 includes a processing unit 72 and memory 74. The processing unit 72 may be a microprocessor, microcontroller, digital signal processor, central processing unit and/or any other device that manipulates digital information based on programming instructions. The memory 74 may be read-only memory, random access memory, floppy disk memory, hard disk memory, external memory, and/or any other device that stores digital information.

The memory 74 stores programming instructions that, when read by the processing unit 72, causes the processing unit to function as a plurality of circuits 76–84. While executing the programming instructions, the processing unit 72 functions as circuit 76 to receive a series of frames of data. Next, the processing unit functions as circuit 78 to queue the commands of the series of frames. The processing unit then functions as circuit 80 to pause processing of the commands when the synchronize command is detected. The processing unit then functions as circuit 82 to detect the next cycle of a refresh rate. Having done that, the processing unit functions as circuit 84 to resume processing of the commands when the next cycle of the refresh rate is detected. The programming instructions stored in memory and the execution thereof by the processing unit will be discussed in greater detail with reference to FIG. 6.

Figure 5:
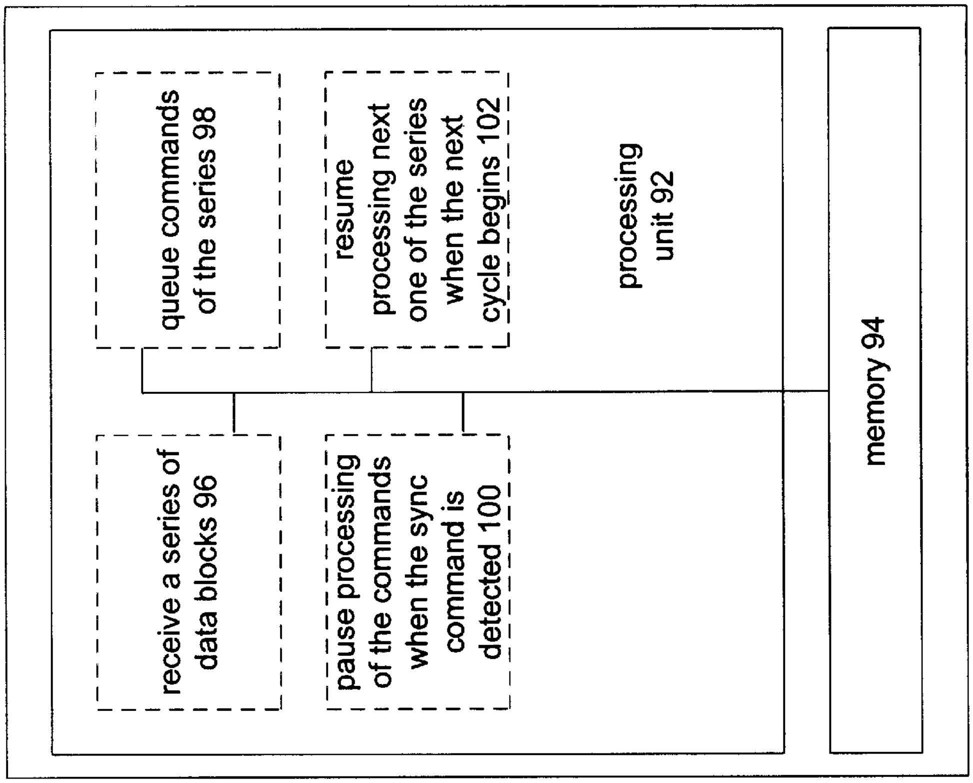
FIG. 5 illustrates a schematic block diagram of a co-processing circuit in accordance with the present invention.

FIG. 5 illustrates a schematic block diagram of a co-processing circuit 90 that includes a processing unit 92 and memory 94. The processing unit may be a microprocessor, microcontroller, micro computer, digital signal processor, central processing unit, and/or any other device that manipulates digital information based on programming instructions. The memory 94 may be read-only memory, random access memory, hard drive memory, floppy disk memory, magnetic tape memory, external memory, and/or any other device that stores digital information.

The memory 94 stores programming instructions that, when read by the processing unit, causes the processing unit to function as a plurality of circuits 96–102. While executing the programming instructions, the processing unit 92 functions as circuit 96 to receive a series of data blocks. The processing unit then functions as circuit 98 to queue commands of the series of data blocks. The processing unit then functions as circuit 100 to pause processing of the commands when a synchronized command is detected. The processing unit then functions as 102 to resume processing of the commands in the next data block when the next processing cycle begins. The programming instructions stored in memory 94 and executed by processing unit 92 will be discussed in greater detail with reference to FIG. 7.

Figure 6:
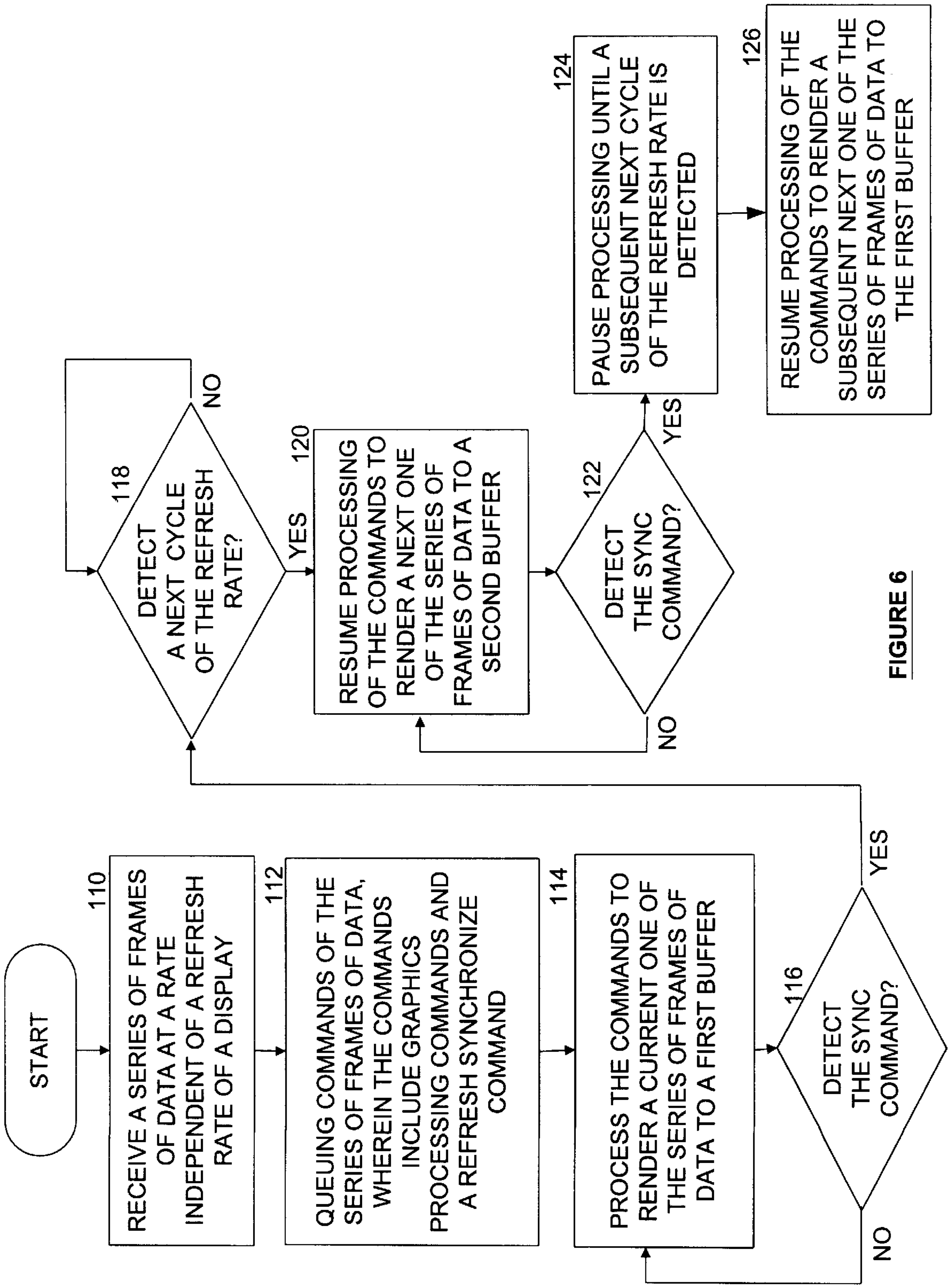
FIG. 6 illustrates a logic diagram of a method for double buffering in accordance with the present invention.

FIG. 6 illustrates a logic diagram of a method for processing video data in accordance with the present invention. The process begins at step 110 where a series of frames of data are received at a rate that is independent of the refresh rate of the display. The series of frames may include graphics data and commands wherein the commands indicate to the video graphics co-processor instructions on how to process the graphics data. Typically, the series of frames of data will be received from a central processing unit 12, as previously discussed.

The process then proceeds to step 112 where the commands of the series of frames are queued. The commands will include graphics processing commands and a refresh synchronized command. The process then proceeds to step 114 where the video graphics co-processor processes the commands to render a current frame of the series of frames of data utilizing a first buffer. The process then proceeds to step 116 where a determination is made as to whether a synchronize command has been detected. If not, the process continues to repeat steps 114 and 116 until the synchronize command is detected. Note that the processing rate synchronize command may be detected on a leading edge of a vertical blanking interval, the trailing edge of a vertical blanking interval, a release of video overlay, detecting downloading of video data and/or detecting idle states of a video graphic user interface.

Once the synchronize command has been detected, the process proceeds to step 118 where a determination is made as to whether the next cycle of the refresh rate has been detected. The next refresh cycle may be detected by detecting the vertical blanking interval of a frame of data. Once the next cycle of the refresh rate has been detected, the process proceeds to step 120 where the video graphics co-processor resumes processing of the commands to render a next one of the series of frames of data utilizing the second buffer. As a result of the next cycle and the synchronize command being detected, a page flip occurs. While the video graphics processor is providing video graphics data to the second buffer, the video graphics data stored in the first buffer is provided to a display driver.

The process then proceeds to step 122 where a determination is made as to whether the next synchronize command is received. If not, the process continues to repeat steps 120 and 122 until the synchronize command is detected. When the synchronize command is detected, the process proceeds to step 124 where the video graphics co-processing is paused until a subsequent next cycle of the refresh rate is detected. Once detected, the process proceeds to step 126 where the video graphics co-processor resumes processing of the commands to render a subsequent next one of the series of frames of data to the first buffer. As such, another page flip has occurred such that the video graphics co-processor is again writing data to the first buffer while the second buffer is again providing video graphics data to the display driver.

Figure 7:
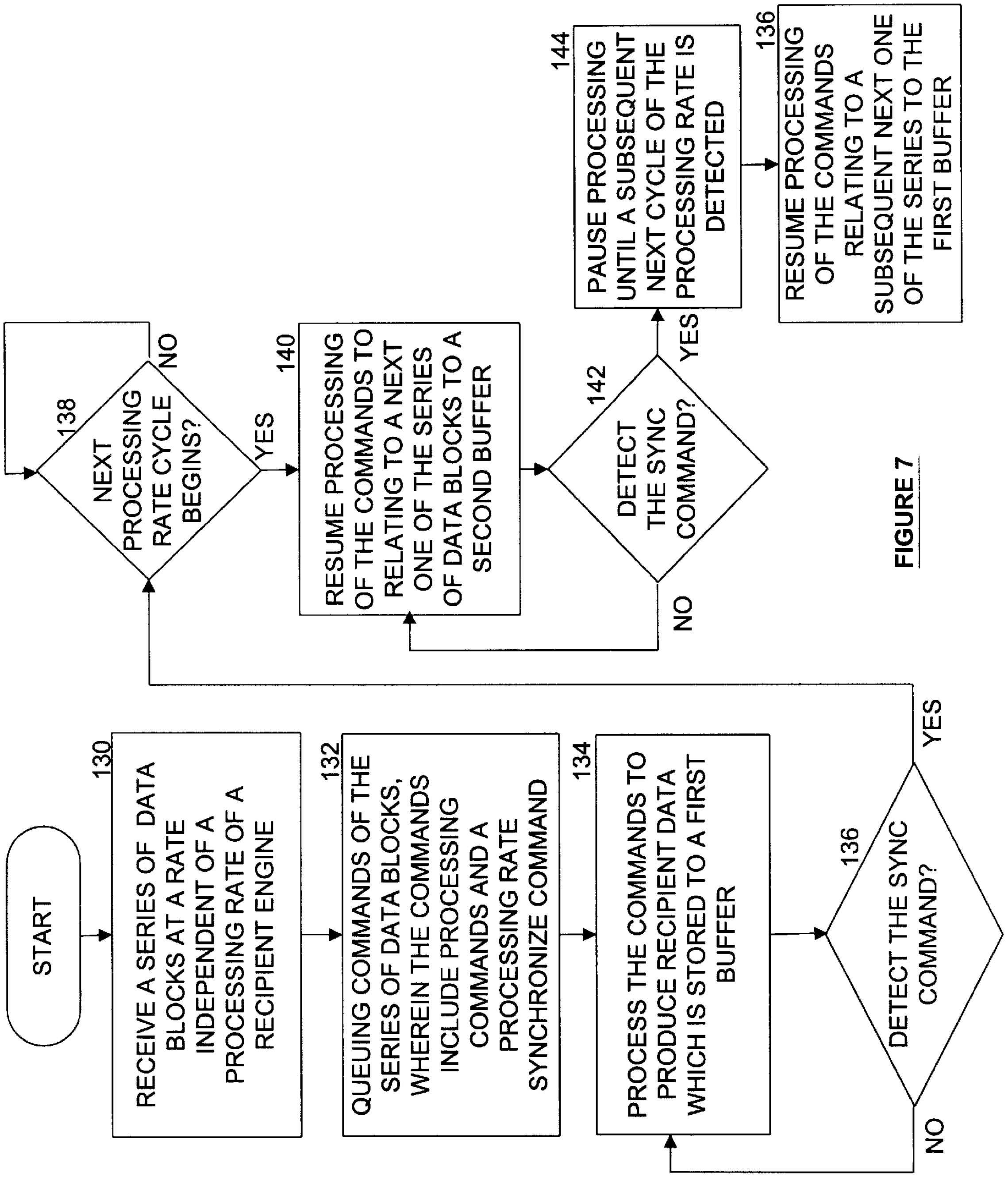
FIG. 7 illustrates a logic diagram of an alternate method for double buffering in accordance with the present invention.

FIG. 7 illustrates a logic diagram of a method for double buffering in a co-processing system. The processes begins at step 130 where a series of data blocks are received at a rate independent of a processing rate of a recipient engine. The process then proceeds to step 132 where commands of the series of data blocks are queued. The commands include processing commands and a processing rate synchronize command. The process then proceeds to step 134 where the commands are processed to produce recipient data that is stored in a first buffer. The process then proceeds to step 136 where a determination is made as to whether the processing rate synchronize command has been detected. If not, the process repeats steps 134 and 136 until the synchronize command is detected.

Having detected the synchronize command, the process proceeds to step 138 where a determination is made as to whether the next processing rate cycle has begun. Once the next processing rate cycle begins, the process proceeds to step 140 where the co-processor resumes processing of the commands related to a next one of the series of data blocks. The processed data is provided to a second buffer. As such, a page flip occurred such that the co-processor is writing to the second buffer and the recipient engine is receiving processed data from the first buffer. The process then proceeds to step 142 where a determination is made as to whether the synchronize command has been detected. If not, the process repeats steps 140 and 142 until the synchronize command has been detected.

Once the synchronize command has been detected, the process proceeds to step 144. At step 144, the co-processor pauses processing until a subsequent next cycle of the processing rate is detected. The process then proceeds to step 136 where the co-processor resumes processing of the commands related to a next subsequent one of the series of data blocks. The processed data is stored in the first buffer. As such, another page flip has occurred.

The preceding discussion has presented a method and apparatus for co-processing data blocks at a rate independent of the processing rate of subsequent recipient engines. For example, in a video graphics co-processor, the central processing unit may provide video graphics information, i.e., software overhead, to the hardware video graphics co-processor. The providing of the software overhead to the video graphics co-processor may be done at a rate independent of the display rate of the display. As such, parallel processing between the software portion and the hardware portion of video rendering may be achieved. By parallel processing such functions, the system is capable of processing more data within a single refresh rate such that page flipping occurs at the refresh rate as opposed to one-half, or less, of the refresh rate. As one of average skill in the art will appreciate, the teachings of the present invention are equally applicable to single buffering, triple buffering, or any other type of buffering that includes page flipping.

What is claimed is:

1. A method for improved display double buffering, the method comprises the steps of:

a) receiving a series of frames of data at rate independent of a refresh rate of a display;

b) queuing commands of the series of frames of data, wherein the commands include graphics processing commands and a refresh synchronize command, wherein the commands are processed to render a current one of the series of frames of data to a first buffer;

c) when the synchronize command is detected, pausing processing of the commands;

d) detecting a next cycle of the refresh rate; and e) when the refresh rate is detected, resuming processing of the commands to render a next one of the series of frames to a second buffer.

2. The method of claim 1, wherein each of the series of frames of data further comprises graphics data that is queued along with the commands.

3. The method of claim 1, wherein step (d) further comprises detecting a blanking interval that indicates the next cycle of the refresh rate.

4. The method of claim 1, wherein the step (d) further comprises providing the current one of the series of frames from the first buffer to the display.

5. The method of claim 1 further comprises:

detecting a next synchronize command;

pausing processing of the commands of the next one of the series of frames of data;

detecting a subsequent next cycle of the refresh rate; and when the subsequent next cycle of the refresh rate is detected, resuming processing of the commands to render a subsequent next one of the series of frames of data to the first buffer.

6. The method of claim 5 further comprises providing the next one of the series of frames from the second buffer to the display.

7. A method for co-processing comprises the steps of:

a) receiving a series of data blocks at rate independent of a processing rate of a recipient engine;

b) queuing commands of the series of data blocks, wherein the commands includes processing commands and a processing rate synchronize command, wherein the commands of one of the series of data blocks are processed to produce recipient data, wherein the recipient data is stored in a first buffer;

c) when the processing rate synchronize command is detected, pausing processing of the commands and providing, from the first buffer, the recipient data to the recipient engine at a beginning of a next cycle of the processing rate; and d) when the next cycle processing rate begins, resuming processing of the commands relating to a next one of the series of data blocks to produce second recipient data, wherein the second recipient data is stored in a second buffer.

8. The method of claim 7 further comprises:

detecting a next processing rate synchronize command;

pausing processing of the commands relating to the next one of the series of data blocks;

detecting a subsequent next cycle of the processing rate; and when the subsequent next cycle of the processing rate is detected, resuming processing of the commands to render a subsequent next one of the series of data blocks to the first buffer.

9. The method of claim 8 further comprises providing the next one of the series of data blocks from the second buffer to the recipient engine.

10. The method of claim 7, wherein the processing rate synchronize command further comprises at least one: detect leading edge of vertical blanking, detect trailing edge of the vertical blanking, detect release of video overlay, detect download of video data, and detect idle state of a graphic user interface.

11. A video graphics circuit comprises:

data receiving module operably coupled to receive commands contained in a series of frames of data, wherein the series of frames of data is received at a rate independent of a refresh rate of a display wherein the data receiving modules queues the commands, and wherein the commands include graphics processing commands and a refresh synchronize command;

video processing module operably coupled to receive the commands that have been queued, wherein the video processing module performs the commands to render a current one of the series of frames of data until the refresh synchronize command is detected;

frame buffer operably coupled to the video processing module, wherein the frame buffer includes a first buffer and a second buffer, wherein the first buffer receives and stores the current one of the series of frames of data and the second buffer stores a previous one of the series of frames of data; and wherein the video processing module resumes processing commands to render a next one of the series of frames of data after a next cycle of the refresh rate is detected and wherein the second buffer overwrites the previous one of the series of frames of data with the next one of the series of frames of data.

12. The video graphics circuit of claim 11 further comprises a display driver operably coupled to the frame buffer, wherein the display driver receives the previous one of the series of frames of data from the second buffer prior to the next cycle of the refresh rate and receives the current one of the series of frames of data from the first buffer after the next cycle of the refresh rate.

13. The video graphics circuit of claim 11, wherein the data receiving module further comprises a queuing buffer operably coupled to receive and temporarily store the commands and an event engine operably coupled to the queuing buffer, wherein the event engine monitors the commands provided to the video processing module to detect the refresh synchronize command, and wherein the event engine suspends providing of commands to the video processing module until the next cycle of the refresh rate is detected.

14. The video graphics circuit of claim 13, wherein the next cycle of the refresh rate is indicated by at least one of: a leading edge of a vertical blanking interval, a trailing edge of the vertical blanking interval, and the presence of the vertical blanking interval.

15. A video graphics circuit comprises:

a processing unit; and memory operably coupled to the processing unit, wherein the memory stores programming instructions that, when read by the processing unit, cause the processing unit to a) receive a series of frames of data at rate independent of a refresh rate of a display; b) queue commands of the series of frames of data, wherein the commands includes graphics processing commands and a refresh synchronize command, wherein the commands are processed to render a current one of the series of frames to a first buffer; c) pause processing of the commands when the synchronize command is detected; d) detect a next cycle of the refresh rate; and e) resume processing of the commands to render a next one of the series of frames to a second buffer when the next cycle of the refresh rate is detected.

16. The video graphics circuit of claim 15, wherein the memory further comprises programming instructions that cause the processing unit to detect a blanking interval that indicates the next cycle of the refresh rate.

17. The video graphics circuit of claim 15, wherein the memory further comprises programming instructions that cause the processing unit to provide the current one of the series of frames from the first buffer to the display.

18. The video graphics circuit of claim 15, wherein the memory further comprises programming instructions that cause the processing unit to:

detect a next synchronize command;

pause processing of the commands of the next one of the series of frames of data;

detect a subsequent next cycle of the refresh rate; and resume processing of the commands to render a subsequent next one of the series of frames of data to the first buffer when the subsequent next cycle of the refresh rate is detected.

19. The video graphics circuit of claim 18, wherein the memory further comprises programming instructions that cause the processing unit to provide the next one of the series of frames from the second buffer to the display.

20. A co-processing circuit comprises:

a processing unit; and memory operably coupled to the processing unit, wherein the memory stores programming instructions that, when read by the processing unit, cause the processing unit to a) receive a series of data blocks at rate independent of a processing rate of a recipient engine; b) queue commands of the series of data blocks, wherein the commands includes processing commands and a processing rate synchronize command, wherein the commands of one of the series of data blocks are processed to produce recipient data, wherein the recipient data is stored in a first buffer; c) pause processing of the commands when the processing rate synchronize command is detected and providing, from the first buffer, the recipient data to the recipient engine at a beginning of a next cycle of the processing rate; and d) resume processing of the commands relating to a next one of the series of data blocks to produce second recipient data when the next cycle processing rate begins, wherein the second recipient data is stored in a second buffer.

21. The co-processing circuit of claim 20, wherein the memory further comprises programming instructions that cause the processing unit to:

detect a next processing rate synchronize command;

pause processing of the commands relating to the next one of the series of data blocks;

detect a subsequent next cycle of the processing rate; and resume processing of the commands to render a subsequent next one of the series of data blocks to the first buffer when the subsequent next cycle of the processing rate is detected.

22. The co-processing circuit of claim 21, wherein the memory further comprises programming instructions that cause the processing unit to provide the next one of the series of data blocks from the second buffer to the recipient engine.

23. The co-processing circuit of claim 21, wherein the processing rate synchronize command further comprises at least one: detect leading edge of vertical blanking, detect trailing edge of the vertical blanking, detect release of video overlay, detect download of video data, and detect idle state of a graphic user interface.

* * * * *